United States Patent
Ao (10) Patent No.: US 7,832,282 B2
(45) Date of Patent: Nov. 16, 2010

(54) ULTRASONIC FLOW MEASUREMENT SYSTEM AND METHOD

(75) Inventor: Xiaolei Shirley Ao, Lexington, MA (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 12/265,322

(22) Filed: Nov. 5, 2008

(65) Prior Publication Data

US 2010/0107777 A1 May 6, 2010

(51) Int. Cl.
*G01F 1/66* (2006.01)
(52) U.S. Cl. .................. 73/861.28; 73/861.26
(58) Field of Classification Search .......... None
See application file for complete search history.

(56) References Cited

U.S. PATENT DOCUMENTS

| | | | | |
|---|---|---|---|---|
| 3,738,169 A | * | 6/1973 | Courty | 73/861.03 |
| 3,964,308 A | * | 6/1976 | Scarpa | 73/861.27 |
| 5,515,733 A | | 5/1996 | Lynnworth | |
| 6,293,156 B1 | * | 9/2001 | Shen et al. | 73/861.26 |
| 6,626,049 B1 | * | 9/2003 | Ao | 73/861.29 |
| 7,000,485 B2 | * | 2/2006 | Ao et al. | 73/861.29 |
| 7,096,135 B2 | * | 8/2006 | Ao et al. | 73/861.27 |
| 2008/0098824 A1 | | 5/2008 | Bailey | |

FOREIGN PATENT DOCUMENTS

| | | |
|---|---|---|
| GB | 1359151 A | 7/1974 |
| WO | 98/19296 A1 | 5/1998 |
| WO | 2005/121717 A1 | 12/2005 |

OTHER PUBLICATIONS

EP Search Report issued in connection with corresponding EP Patent Application No. 09173712.2 filed on Oct. 22, 2009.

* cited by examiner

*Primary Examiner*—Harshad Patel
(74) *Attorney, Agent, or Firm*—Global Patent Operation; Mark A. Conklin (57) ABSTRACT

An ultrasonic measurement system for measuring a flow in a conduit. Spaced ultrasonic signal transmitters are configured to launch a ultrasonic beams having a center axis of maximum intensity. Receiving transducers are configured to receive modulated signal energy from the beams and are located off the center axis of the beams to increase the modulation of the signal energy and to produce receiver output signals. A processing subsystem is configured to correlate the receiver output signals to determine a time delay indicative of the flow velocity in the conduit.

10 Claims, 6 Drawing Sheets

ULTRASONIC FLOW MEASUREMENT SYSTEM AND METHOD

FIELD OF THE INVENTION

This subject invention relates to ultrasonic flow measurement systems.

BACKGROUND OF THE INVENTION

Ultrasonic transducers in combination with cross-correlation techniques are used to determine the flow rate of a gas or liquid flowing in a conduit. The cross-correlation technique has an advantage in low pressure gas flow measurement and clamp-on high temperature liquid flow measurement because the transmitted signal or transmitted signal to noise ratio need not be as high as required for a transit time meter. In this measurement technology, two axially spaced ultrasonic transmitters are clamped to one side of the conduit and two corresponding ultrasonic receivers are clamped to an opposite side of the conduit. A "tag" in the flow in the conduit modulates frequency and amplitude of the ultrasonic signals launched by the transmitters and the resulting signals modulations received by the receivers are cross-correlated to determine the travel time of the tag from one transmitter/receiver pair path to the other. Since the path length is known, the flow rate of the tag and thus the flow rate of the flow in the conduit can be determined. See U.S. Pat. No. 6,293,156, column 2, lines 1-17. This patent is incorporated herein by this reference. The focus of the '156 patent disclosure is a method of reducing cross talk (noise) in such a system whereby the transmitters are mounted so as to create a shadow zone and the receivers are positioned in the shadow zone.

Usually, care is taken to precisely align the receiver with the highest intensity region (i.e., the center axis) of the ultrasonic beam launched by the transmitter so signals of sufficient amplitude are detected by the receiver so that the modulations of the transmission can be obtained (modulation is the signal in this technique).

When the flow rate is low and the flow turbulence is utilized as the tag which may be the case in a wide variety of industry applications such as measuring the high temperature flow rate of feed water in a nuclear power plant, the modulation or "signal" produced by the tag is generally very weak. In such situations, averaging over a long period of time is required, the response time is slow, and the accuracy of the flow rate measurements can suffer considering that the flow rate can change. Therefore, there is a need to use a correlation technique to measure flow with low transmitted signal. There is also a need to have a cross correlation meter able to measure low flow.

BRIEF SUMMARY OF THE INVENTION

In one preferred embodiment, the subject invention relates an ultrasonic measurement system and method which provides enhanced modulation and a higher signal to noise ratio. Aspects of the subject invention, in one example, include such a system and method which features a reduced response time, and improved reliability and accuracy.

A system and method in accordance with the subject invention can be used to monitor the flow of the feed water in a nuclear power plant. The invention, in one example, is able to measure changes in the flow profile and also detect the presence of cross flow. The system can be used in a clamped on or wetted configuration and can employ standard ultrasonic transducers.

The subject invention results from the realization, in part, that by purposefully misaligning the receiving transducers in an angle with respect to the ultrasonic beams launched by the ultrasonic transmitters, the modulation of the signals received by the receiving transducers is enhanced providing an ultrasonic measurement system and method with a higher signal to noise ratio, a faster response time, and better accuracy.

This subject invention features an ultrasonic measurement system for measuring a flow in a conduit. The preferred system comprises a first ultrasonic signal transmitter configured to launch a first ultrasonic beam having a center axis of maximum intensity and a first receiving transducer configured to receive modulated signal energy from the first ultrasonic beam. The first receiving transducer is located off the center axis of the first beam to increase the modulation of the signal energy and produces a first receiver output signal. A second ultrasonic transmitter is spaced from the first ultrasonic transmitter and is configured to launch a second ultrasonic beam also having a center axis of maximum intensity. A second receiving transducer is axially configured to receive modulated signal energy from the second ultrasonic beam and the second receiving transducer is located off the center axis of the second beam to increase the modulation of the signal energy and produces a second receiver output signal. A processing subsystem is configured to correlate the first and second receiver output signals to determine a time delay indicative of the flow velocity in the conduit.

The first and second ultrasonic signal transmitters may be configured to launch beams normal or at an angle to the flow. In one example, the first and second ultrasonic signal transmitters and the first and second receiving transducers are clamped onto the exterior of the conduit. There may also be at least a third receiving transducer in each axial location for detecting a second tag path in a chordal plane.

An ultrasonic measurement method for measuring a flow in a conduit, in accordance with the subject invention, features configuring a first ultrasonic signal transmitter to launch a first ultrasonic beam having a center axis of maximum intensity and locating a first receiving transducer off the center axis of the first beam to receive modulated signal energy from the first ultrasonic beam to produce a first receiver output signal. A second ultrasonic transmitter is spaced from the first ultrasonic transmitter and is configured to launch a second ultrasonic beam also having a center axis of maximum intensity. A second receiving transducer is located off the center axis of the second beam to receive modulated signal energy from the second ultrasonic beam and to produce a second receiver output signal. The first and second receiver output signals are cross-correlated to determine a time delay indicative of the flow velocity in the conduit.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Due to the high directivity of ultrasonic transducers, in accordance with the subject invention, the transmitter and receiver are aligned in such a way that the received signals detected are at the sharp slope of the intensity distribution. Any small predication of the angle changes due to flow introduces a much higher modulation than in an aligned configuration. This change of signal amplitude (modulation) is directly related to the flow signal. Therefore, the signal to noise ratio is greatly increased prior to any further signal processing in accordance with the method of the subject invention. The finite size of the transducer aperture allows a wide range of misalignment from a few degrees to 90 degrees. This provides high flexibility for the configuration of the meter system for optimization. Moreover, more than one receiving transducer can be used in each channel allowing more than one tag path to be detected. Also, the off diameter cord path can be detected which provides information indicative of the flow profile and any cross-flow resulting in higher meter accuracy. The invention can be accomplished with wetted or clamped on ultrasonic transducers.

Figure 1:
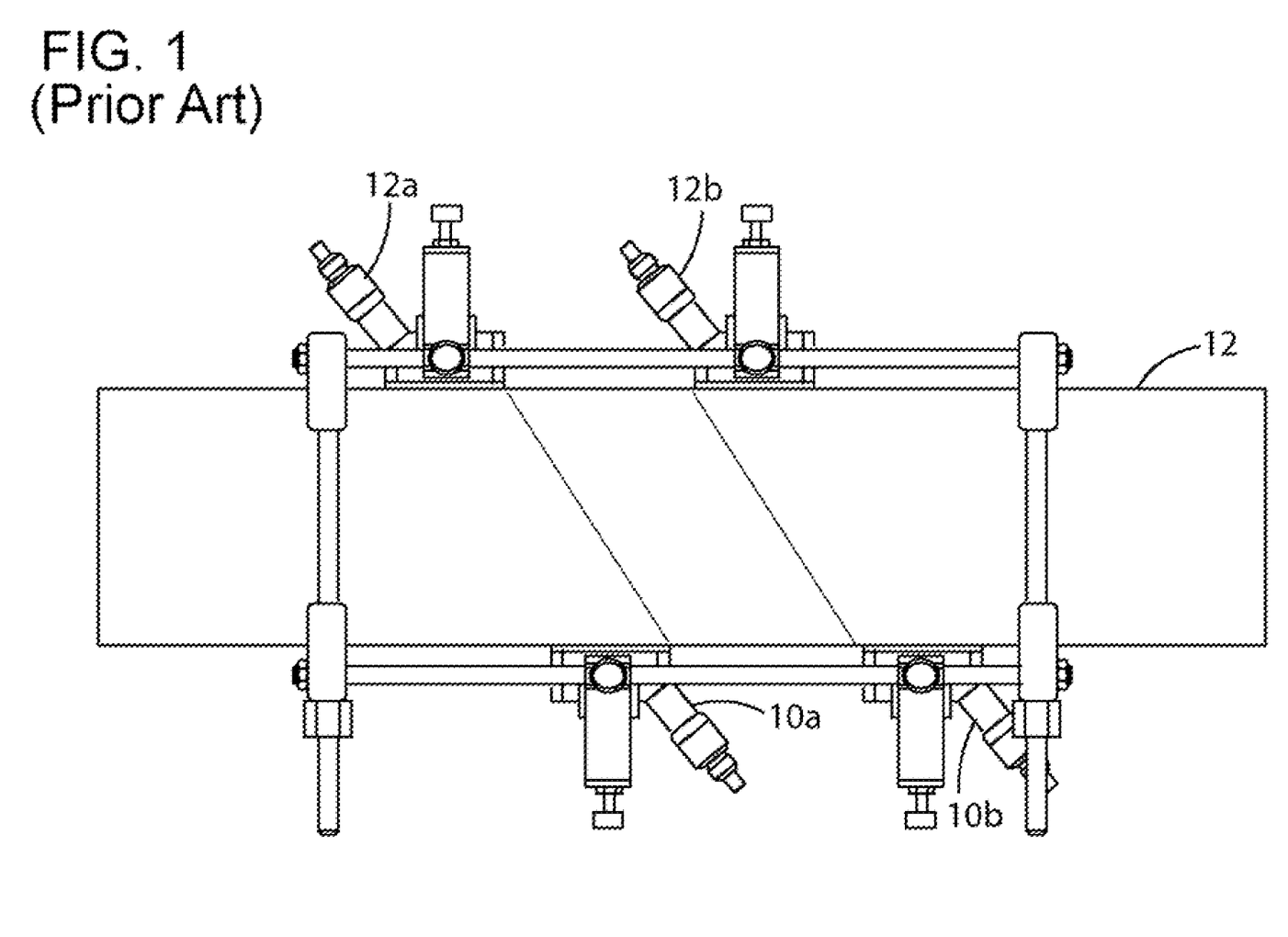
FIG. 1 is a schematic three-dimensional view showing the configuration of a typical prior art ultrasonic measurement system.
Figure 2:
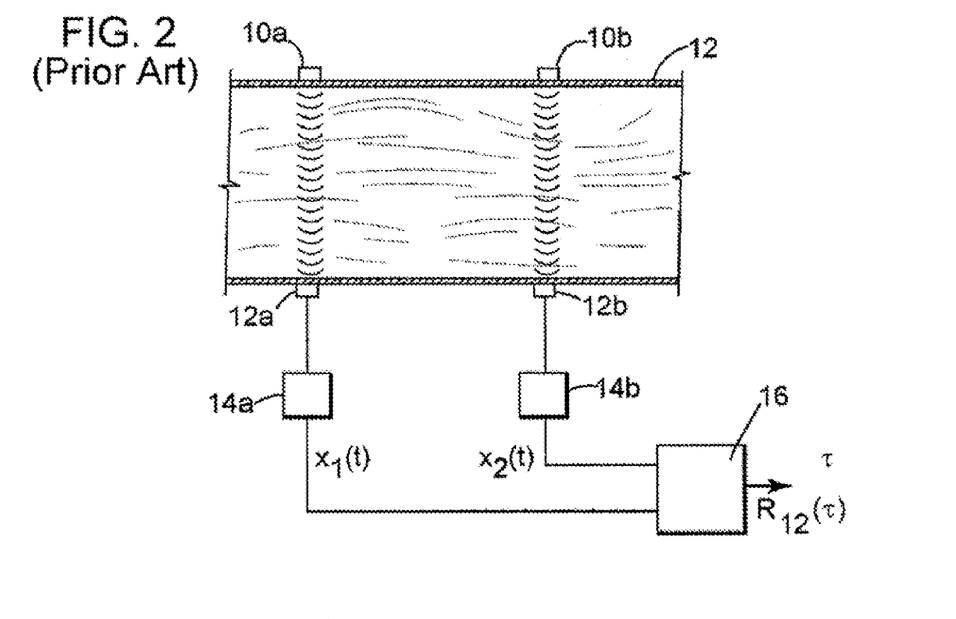
FIG. 2 is highly schematic block diagram showing the primary components associated with the system shown in FIG. 1.
Figure 3A:
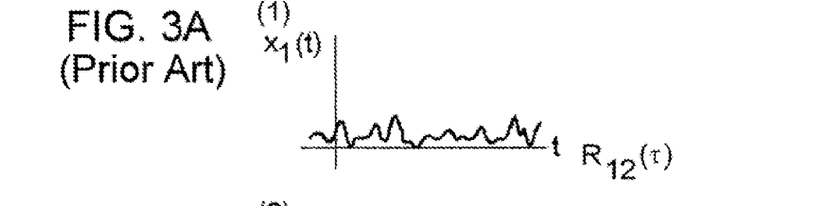
FIG. 3A and FIG. 3B are plots showing the signals received by the receiving transducers of the system shown in FIG. 2.

FIGS. 1 and 2 show a typical ultrasonic flow measurement system design in accordance with the prior art wherein ultrasonic transmitters 10a and 10b are clamped at a spaced distance from one another to the one-side of conduit 12 and two corresponding ultrasonic receivers 12a and 12b are clamped to an opposite side of the conduit. Tags in the flow in conduit 12 modulate the ultrasonic signals launched by transmitters 10a and 10b and the resulting signals received by receivers 12a and 12b after being demodulated by demodulators 14a and 14b (FIG. 2) are as shown in FIG. 3A (for receiver 12a) and FIG. 3B (for receiver 12b). Note the phase shift between the signal of FIG. 3A and signal of FIG. 3B which corresponds to a time delay caused by the tag in the flow in conduit 12. Therefore, cross-correlation techniques are employed by correlator 16, FIG. 2 producing the signal shown in FIG. 4 where peak 18 is indicative of the distance it took a tag to flow from the path defined by transmitter 10a and receiver 12a to the path defined by transmitter 10b and receiver 12b, FIG. 2. The path distance is known and in this way the flow rate of the flow within conduit 12 is measured. Correlator 16 may be part of a processor or processing system which completes the necessary calculations and outputs the flow rate.

Figure 5:
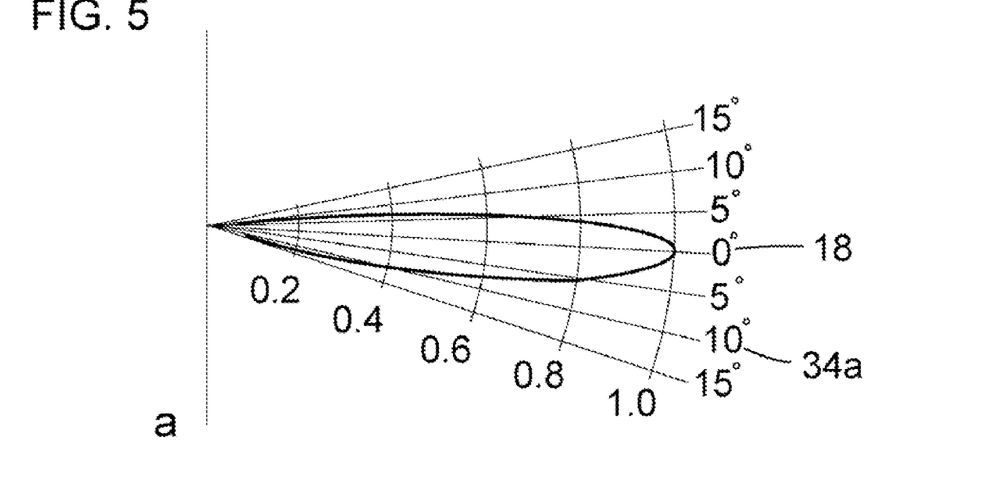
FIG. 5 is a plot showing the angular characteristics versus pressure of a typical ultrasonic beam profile.
Figure 6:
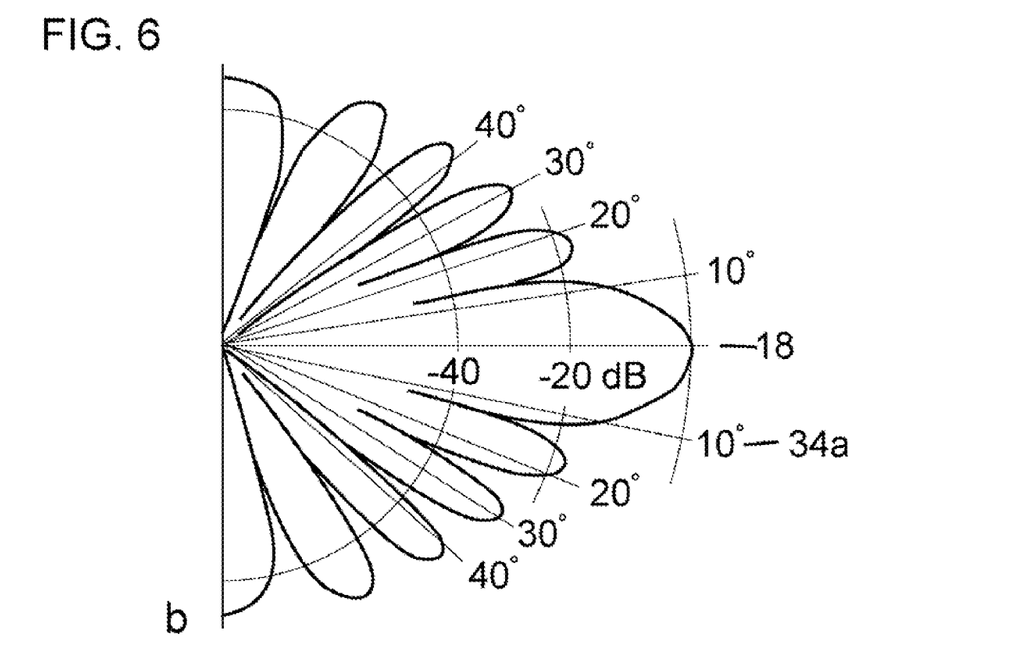
FIG. 6 is a plot similar to FIG. 5 wherein the angular characteristics are plotted in decibels.

Typically, care is taken so that each transmitter/receiver pair is aligned on the center axis 18, FIGS. 5 and 6 of the ultrasonic beam launched by the ultrasonic transmitter so signals of sufficient amplitude can be detected by the receivers.

Figure 7:
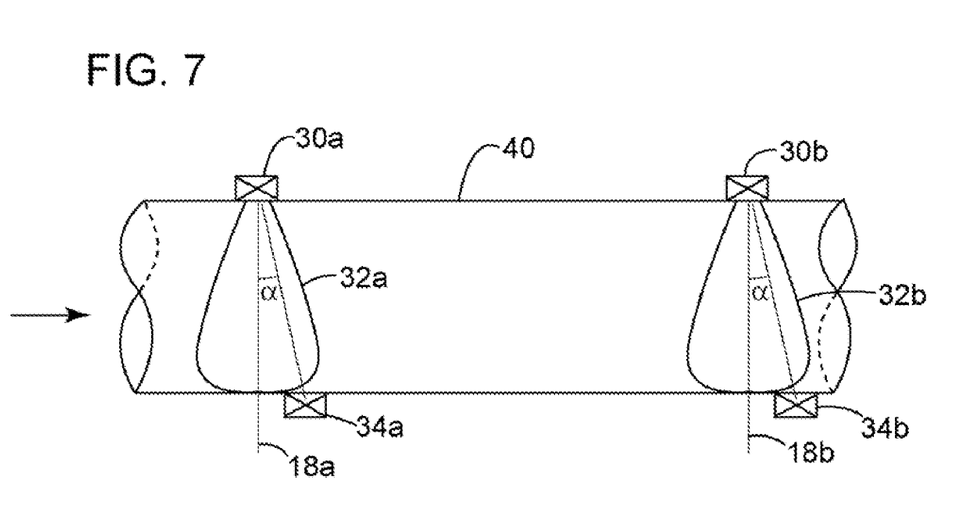
FIG. 7 is a highly schematic side view of an example of an ultrasonic measurement system in accordance with the subject invention.

As stated above, in accordance with the subject invention, the respective ultrasonic receiving transducers are purposefully located off the center axis of the ultrasonic beam launched by their respective ultrasonic transmitters as shown in FIG. 7. Ultrasonic signal transmitter 30a is configured to launch a first ultrasonic beam 32a having a center axis 18a of maximum intensity. Receiving transducer 34a is configured to receive modulated signal energy from beam 32a and is located off center axis 18a of beam 32a to increase the modulation of the signal energy. Ultrasonic transmitter 30b is spaced from ultrasonic transmitter 30a and is configured to launch ultrasonic beam 32b also having a center axis 18b of maximum intensity. Receiving transducer 34b for this path receives modulated signal energy from beam 32b and is also located off the center axis 18b of beam 32b to increase the modulation of the signal energy. Similar to the configuration of FIG. 2, both ultrasonic receiving transducers 34a and 34b provide an output signal (see FIGS. 3A-3B) and a processing system is configured to cross-correlate these two output signals to determine a time delay indicative of the flow velocity in conduit 40.

Figure 3B:
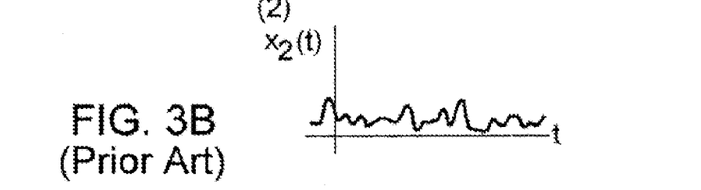
Figure 4:
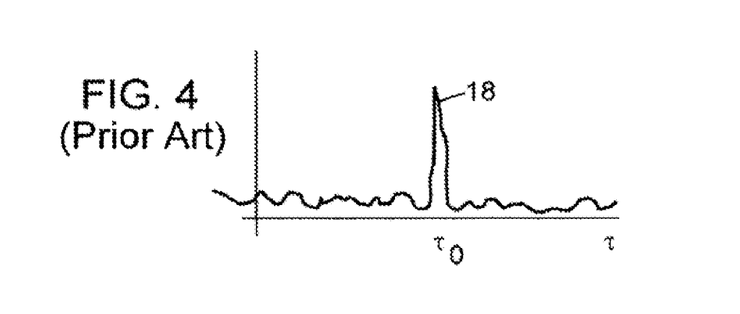
FIG. 4 is a plot showing the signal produced after the signals of FIGS. 3A and 3B are cross-correlated.

The difference, however, is when the flow rate in the conduit is low and the configuration of FIG. 2 is used where receiving transducer 12a is directly aligned with the center axis of the beam launched by transmitter 10a and receiver 12b is directly aligned with the center axis of the beam launched by transmitter 10b, the modulation shown in FIGS. 3A and 3B will be very low and very difficult to detect. Using the configuration shown in FIG. 7, however, in accordance with the subject invention, the modulation will be greater (although the amplitude of the individual signals may be lower).

Figure 8:
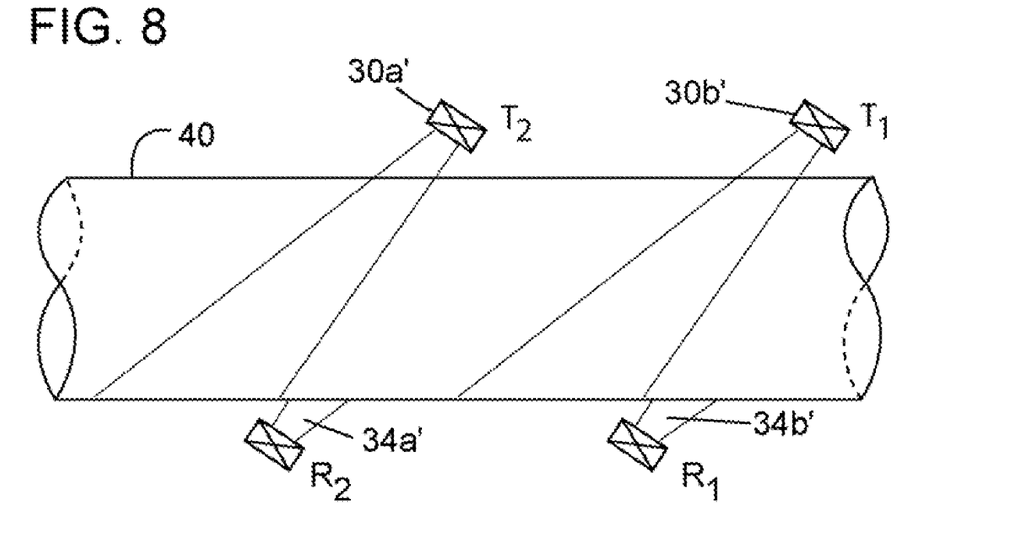
FIG. 8 is another highly schematic side view showing another example of an ultrasonic measurement system in accordance with the subject invention.
Figure 9:
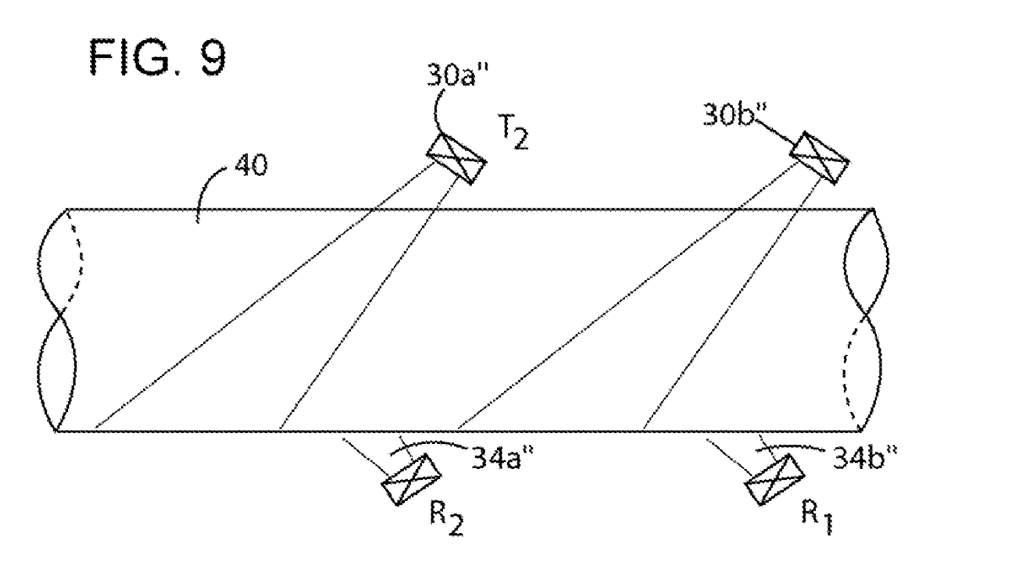
FIG. 9 is a highly schematic side view showing still another example of an ultrasonic measurement system in accordance with the subject invention.

FIG. 7 shows the ultrasonic transmitting transducers launching beams normal to the flow in conduit 40. Typically, transducers 30a and 30b act as transmitters while transducers 34a and 34b act as receivers and then transducers 34a and 34b act as transmitters while transducers 30a and 30b act as receivers as is known in the art. FIG. 8 shows a different configuration where ultrasonic transmitters 30a' and 30b' are angled beam transducers configured to launch beams at an angle to the flow. Corresponding ultrasonic transducer receivers 34a' and 34b' are also angled beam transducers and are offset from the center axis of the beams in their respective paths as shown. FIG. 9 shows still another configuration where the ultrasonic transmitter transducers 30a" and 30b" are oriented to launch an angled beam similar to the configuration shown in FIG. 8, but the offset receiving ultrasonic transducers 34a" and 34b" are angled in the opposite manner. The configuration shown in FIG. 8 may be beneficial when conduit 40 contains a liquid flow; the configuration of FIG. 9 may be preferable when the flow in conduit 40 is gas.

Figure 10:
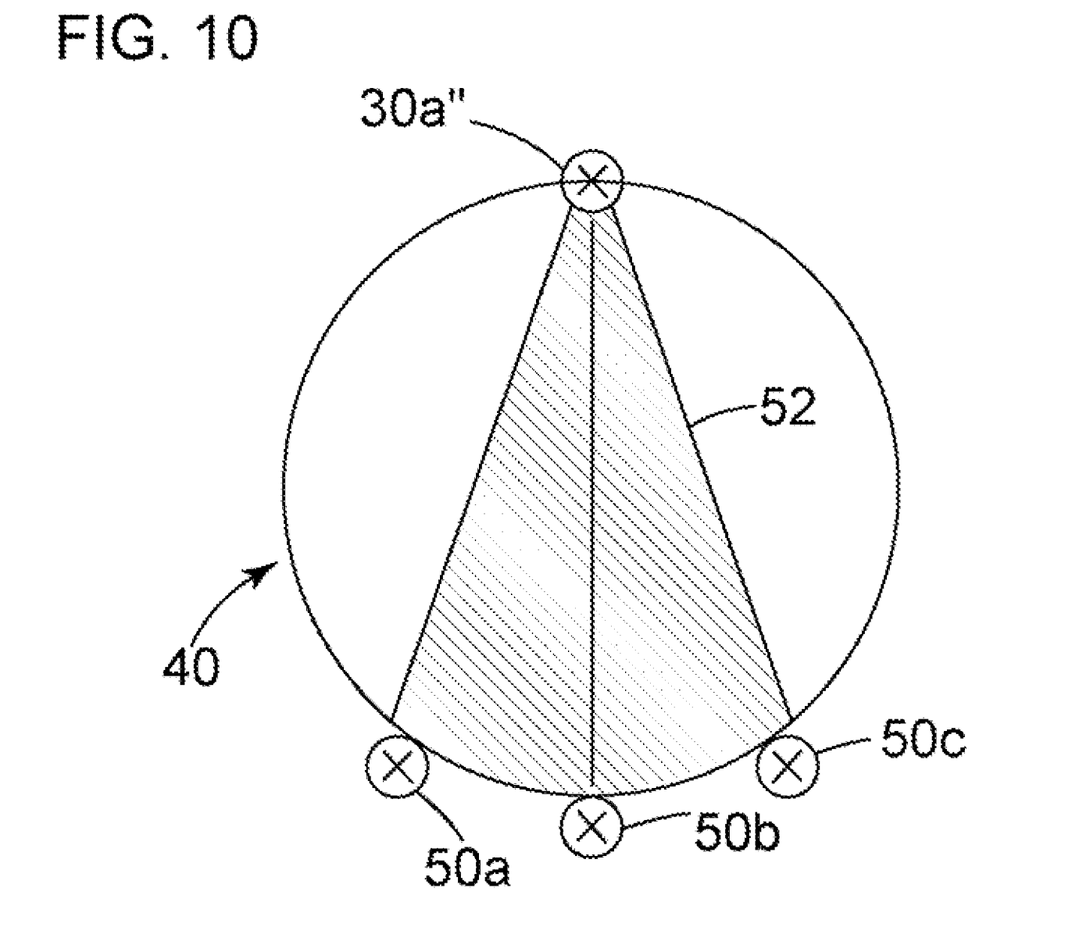
FIG. 10 is a schematic cross-sectional view showing the configuration of still another example of an ultrasonic measurement system in accordance with the subject invention.

FIG. 10 depicts a configuration wherein each channel includes multiple receiving transducers 50a, 50b, and 50c.

Receiving transducer 50b is aligned with the axis of the beam 52 launched by ultrasonic transducer 30a''' while receiving ultrasonic transducers 50a and 50c are misaligned as shown. When a third transducer is added to the two axial locations, it is possible to detect a second tag path along a chordal plane to obtain information regarding the flow profile and even cross-flow in conduit 40.

The misalignment of the receiving transducer with respect to the central axis of the beam can vary from a few degrees to as much as 45 degrees. In one example, FIGS. 5 and 6 show possible angular variations and also the position of receiving transducer 34a of FIG. 7 in one example. FIGS. 8 and 9 show other examples. The transmitting and receiving ultrasonic transducers may be clamped on the conduit or they may be wetted and extend into the conduit. They can be co-planar with a diameter of the pipe cross section or a chord plane illustrated in FIG. 10 at 52.

Therefore, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

The invention claimed is:

1. An ultrasonic measurement system for measuring a flow in a conduit, the system comprising:
   a first transmitting transducer configured to launch a first ultrasonic beam having a center axis of maximum intensity;
   a first receiving transducer configured to receive modulated signal energy from the first ultrasonic beam and to produce a first receiver output signal, the first receiving transducer located off the center axis of the first beam so as to not receive signal energy from the center axis of maximum intensity to increase the measured modulation of the signal energy;
   a second transmitting transducer axially spaced from the first transmitting transducer and configured to launch a second ultrasonic beam also having a center axis of maximum intensity;
   a second receiving transducer configured to receive modulated signal energy from the second ultrasonic beam and to produce a second receiver output signal, the second receiving transducer located off the center axis of the second beam so as to not receive signal energy from the center axis of maximum intensity to increase the measured modulation of the signal energy; and
   a processing subsystem configured to correlate the first and second receiver output signals to determine a time delay indicative of the flow velocity in the conduit.

2. The system of claim 1 in which the first and second transmitting transducers are configured to launch beams normal to the flow.

3. The system of claim 1 in which the first and second transmitting transducers are configured to launch beams at an angle to the flow.

4. The system of claim 1 in which the first and second transmitting transducers and the first and second receiving transducers are clamped onto the exterior of the conduit.

5. The system of claim 1 further including at least a third receiving transducer in each axial location for detecting a second tag path in an off-diameter measurement plane.

6. An ultrasonic measurement method for measuring a flow in a conduit, the method comprising:
   configuring a first transmitting transducer to launch a first ultrasonic beam having a center axis of maximum intensity;
   locating a first receiving transducer off the center axis of the first beam to receive modulated signal energy from the first ultrasonic beam that is not from the center axis of maximum intensity, and to produce a first receiver output signal;
   configuring a second transmitting transducer axially spaced from the first transmitting transducer to launch a second ultrasonic beam also having a center axis of maximum intensity;
   locating a second receiving transducer off the center axis of the second beam to receive modulated signal energy from the second ultrasonic beam that is not from the center axis of maximum intensity, and to produce a second receiver output signal; and
   correlating the first and second receiver output signals to determine a time delay indicative of the flow velocity in the conduit.

7. The method of claim 6 in which the first and second transmitting transducers are configured to launch beams normal to the flow.

8. The method of claim 6 in which the first and second transmitting transducer are configured to launch beams at an angle to the flow.

9. The method of claim 6 in which the first and second transmitting transducers and the first and second receiving transducers are clamped onto the exterior of the conduit.

10. The method of claim 6 further including the step of associating at least a third receiving transducer in each axial location for detecting a second tag path in a chordal plane.

* * * * *

UNITED STATES PATENT AND TRADEMARK OFFICE
CERTIFICATE OF CORRECTION

PATENT NO. : 7,832,282 B2  
APPLICATION NO. : 12/265322  
DATED : November 16, 2010  
INVENTOR(S) : Xiaolei Shirley Ao Page 1 of 1

It is certified that error appears in the above-identified patent and that said Letters Patent is hereby corrected as shown below:

On the Title Page, in Item (75), under "Inventor", in Column 1, Line 1, delete "Ao" and insert -- AO --, therefor.

On Title Page, in Item (57), under "ABSTRACT", in Column 2, Line 3, delete "launch a" and insert -- launch --, therefor.

In Column 5, Line 2, delete "30a""", and insert -- 30a" --, therefor.

In Column 6, Line 49, in Claim 8, delete "transducer" and insert -- transducers --, therefor.

Signed and Sealed this
Twelfth Day of April, 2011

David J. Kappos
*Director of the United States Patent and Trademark Office*